(12) United States Patent
Fujimori et al.

(10) Patent No.: US 6,631,039 B2
(45) Date of Patent: Oct. 7, 2003

(54) OPTICAL UNIT AND PROJECTOR USING THE SAME

(75) Inventors: Motoyuki Fujimori, Suwa (JP); Hisamaro Kato, Suwa (JP); Takeshi Takezawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/925,542

(22) Filed: Aug. 10, 2001

(65) Prior Publication Data

US 2002/0126379 A1 Sep. 12, 2002

(30) Foreign Application Priority Data

Aug. 22, 2000 (JP) ........................................ 2000-250747

(51) Int. Cl.[7] .................................................. G02B 7/02
(52) U.S. Cl. ......................... 359/819; 362/331; 353/100
(58) Field of Search ................................. 359/819, 821, 359/822; 362/331, 375, 622; 353/100, 101, 119; 349/5

(56) References Cited

U.S. PATENT DOCUMENTS 5,760,849 A * 6/1998 Omae et al. ................... 349/5
5,951,136 A * 9/1999 Furuhata et al. .............. 353/31
6,053,616 A * 4/2000 Fujimori et al. ............ 353/119
6,331,878 B1 * 12/2001 Takahara ...................... 349/5
6,364,492 B1 * 4/2002 Fujimori et al. ............ 353/119

FOREIGN PATENT DOCUMENTS

JP WO98/14829 * 4/1998 ........... G03B/21/16

* cited by examiner

*Primary Examiner*—Huy Mai
(74) *Attorney, Agent, or Firm*—Oliff & Berridge, PLC (57) ABSTRACT

The invention provides a technology that makes it possible to easily align optical parts of an illumination optical system. The illumination optical system includes a light source device, a lens array that divides light beams that exit from the light source device into a plurality of partial light beams, and a superimposing optical system that superimposes the plurality of partial light beams on a predetermined illumination area. Two or more of a plurality of optical parts that are disposed in a light path extending from the light source device to the superimposing optical system are mounted to a base frame having a plurality of mounting portions for defining the locations of the two or more optical parts.

10 Claims, 11 Drawing Sheets

OPTICAL UNIT AND PROJECTOR USING THE SAME

BACKGROUND OF THE INVENTION

1. Field of Invention

The present invention relates to a projector that is used for projecting and displaying an image, and, more particularly, to an illumination optical system used in the projector.

2. Description of Related Art

In a projector, the display of an image is achieved by modulating light that exits from an illumination optical system in accordance with image information (image signals) using, for example, liquid crystal light valves, and projecting the modulated light onto a screen.

Such a projector is formed by combining a plurality of optical parts. In a related art device, a plurality of optical parts of a projector are incorporated in one common base frame, with their positions being subjected to fine adjustments in the incorporated state. This base frame includes a plurality of mounting portions that are suitable for mounting each of the optical parts substantially at its corresponding predetermined location.

SUMMARY OF THE INVENTION

Aligning of a plurality of optical parts included in the illumination optical system affects brightness of an image that is projected and displayed, so that it is necessary to align the optical parts of the illumination optical system more precisely than the optical parts of other types of optical systems.

However, when each of the optical parts of the illumination optical system is mounted to the common base frame for the related art projector mentioned above, there is a problem that it is difficult to align each of the optical parts precisely. This is because, in addition to the difficulty in molding the mounting portions of the base frame precisely, there are difficulties in adjusting each of the optical parts used in the illumination optical system due to the separation of the optical parts by relatively narrow gaps, and in confirming whether or not the adjusted state is proper. Such problems become more noticeable when reducing the size of the illumination optical system.

The present invention addresses the above-described problem in the related art technology, and an object of the invention is to provide a technology that makes it possible to easily align optical parts of an illumination optical system.

In order to address at least part of the above-described problem, a base frame is provided for mounting an illumination optical system. The illumination optical system includes a light source device, a lens array that divides light beams that exit from the light source device into a plurality of partial light beams, and a superimposing optical system that superimposes the plurality of partial light beams onto a predetermined illumination area. The base frame is integrally molded and includes a plurality of mounting portions that define locations of two or more of a plurality of optical parts disposed in a light path extending from the light source device to the superimposing optical system.

When such a base frame is used, it is possible to easily align the optical parts of the illumination optical system when assembling the illumination optical system. The advantage of using this base frame becomes particularly noticeable when reducing the size of the illumination optical system.

In the above-described device, the mounting portions may be recesses or protrusions that are provided at an inner side of the base frame, and each optical part may be secured to the recess or the protrusion.

In this way, when the mounting portions of the base frame are formed into recesses or protrusions, the base frame can be formed with a relatively simple structure.

In the above-described device, the base frame may have a substantially rectangular parallelepiped external shape defining a pair of first to third side surfaces, an opening for light that passes through each of the optical parts may be formed in the pair of first side surfaces, the recesses or the protrusions may be provided so as to form a pair at inner sides of the pair of second side surfaces in a direction perpendicular to the pair of third side surfaces, and at least one of the pair of third side surfaces may open to an exterior of the system.

A second aspect of the present invention provides an illumination optical system for illuminating a predetermined illumination area, the illumination optical system including:
  a light source device;
  a lens array that divides light beams that exit from the light source device into a plurality of partial light beams;
  a superimposing optical system that superimposes the plurality of partial light beams onto the predetermined illumination area; and
  a base frame that is integrally molded, and including a plurality of mounting portions that define the locations of two or more of a plurality of optical parts disposed in a light path extending from the light source device to the superimposing optical system.

This illumination optical system includes a base frame that mounts a plurality of optical parts that make up the illumination optical system. In this way, when a base frame for an illumination optical system is separately provided, the optical parts of the illumination optical system can be easily aligned when assembling the illumination optical system. The advantage of using the base frame becomes particularly noticeable when reducing the size of the illumination optical system.

In the above-described device, the mounting portions may be recesses or protrusions that are provided at an inner side of the base frame, and each optical part may be secured to the recess or the protrusion.

In the above-described device, the base frame may have a substantially rectangular parallelepiped external shape defining a pair of first to third side surfaces, an opening for light that passes through each of the optical parts may be formed in the pair of first side surfaces, the recesses or the protrusions may be provided so as to form a pair at inner sides of the pair of second side surfaces in a direction perpendicular to the pair of third side surfaces, and at least one of the pair of third side surfaces may open to the exterior of the system.

In the above-described device, the optical parts may be mounted to the corresponding mounting portions by being sandwiched between corresponding light-incident-surface sides and light-exiting-surface sides thereof.

In the above-described device, the optical parts may be mounted to the corresponding mounting portions so that the mounting portions are in contact with light-incident surfaces or light-exiting surfaces of the optical parts.

In this way, the mounting portions that mount the optical parts of the illumination optical system may be provided so as to sandwich the optical parts or to contact either the light-incident surface or light-exiting surface of each optical part. When the mounting portions are provided as in the latter case, it is possible to increase the degree of freedom of adjusting the locations of the optical parts.

A third aspect of the present invention provides a projector including:

any one of the above-described illumination optical systems;

an electro-optical device that modulates light from the illumination optical system in accordance with image information; and a projection optical system that projects the modulated light beam that is obtained at the electro-optical device.

Since the illumination optical system is used in this projector, aligning of the optical parts of the illumination optical system can be easily performed.

In the above-described device, the illumination optical system, the electro-optical device, and the projection optical system may be mounted to a common base frame that is different from the base frame.

DETAILED DESCRIPTION OF PREFERRED EMBODIMENTS

A. First Embodiment

Figure 1:
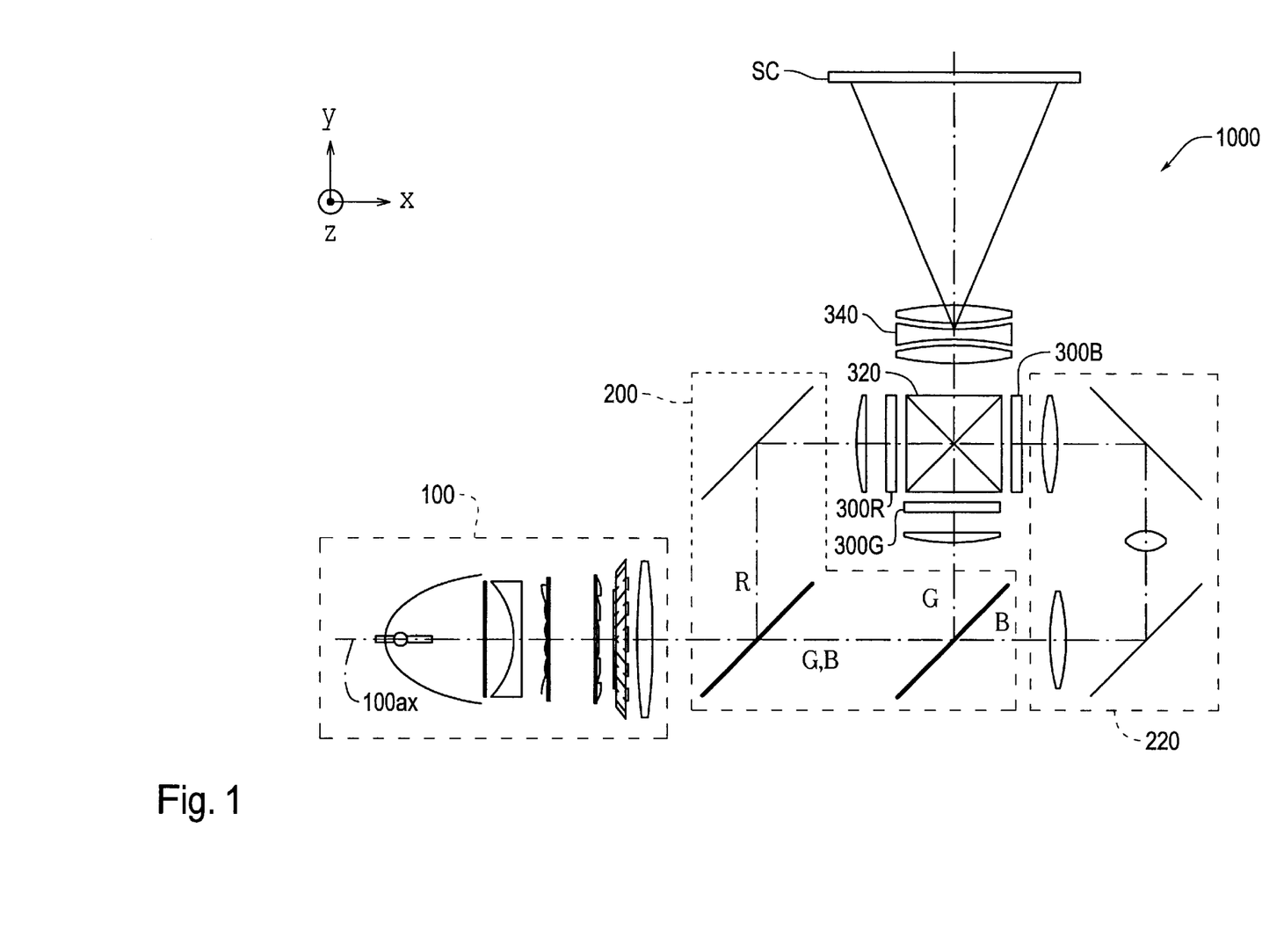
FIG. 1 is a schematic of an example of a projector to which the present invention is applied.

A description of practical forms of the present invention will be provided based on embodiments. FIG. 1 is a schematic structural view of an example of a projector to which the present invention has been applied. A projector 1000 includes an illumination optical system 100, a color light separation optical system 200, a relay optical system 220, three liquid crystal light valves 300R, 300G, and 300B, a cross dichroic prism 320, and a projection optical system 340.

Light that exits from the illumination optical system 100 is separated into color light beams of three colors, a red (R) light beam, a green (G) light beam, and a blue (B) light beam, with the color light separation optical system 200. The separated color light beams are modulated with their corresponding liquid crystal light valves 300R, 300G, and 300B in accordance with image information. Here, the liquid crystal light valves 300R, 300G, and 300B each include a liquid crystal panel that corresponds to an electro-optical device in the present invention and polarizers disposed at a light-incident-surface side and a light-exiting-surface side thereof. A driving portion (not shown) that drives each liquid crystal panel as a result of supplying image information thereto is connected to each of the liquid crystal light valves. The light beams modulated by the liquid crystal light valves 300R, 300G, and 300B in accordance with the image information are synthesized by the cross dichroic prism 320 and are projected onto a screen SC by the projection optical system 340. This causes an image to be displayed on the screen SC. The structure and function of each part of a projector such as that shown in FIG. 1 are disclosed in detail in Japanese Unexamined Patent Application Publication No. 10-325954 by the present applicant of this application, so that a detailed description thereof will not be given in the specification.

Figure 2:
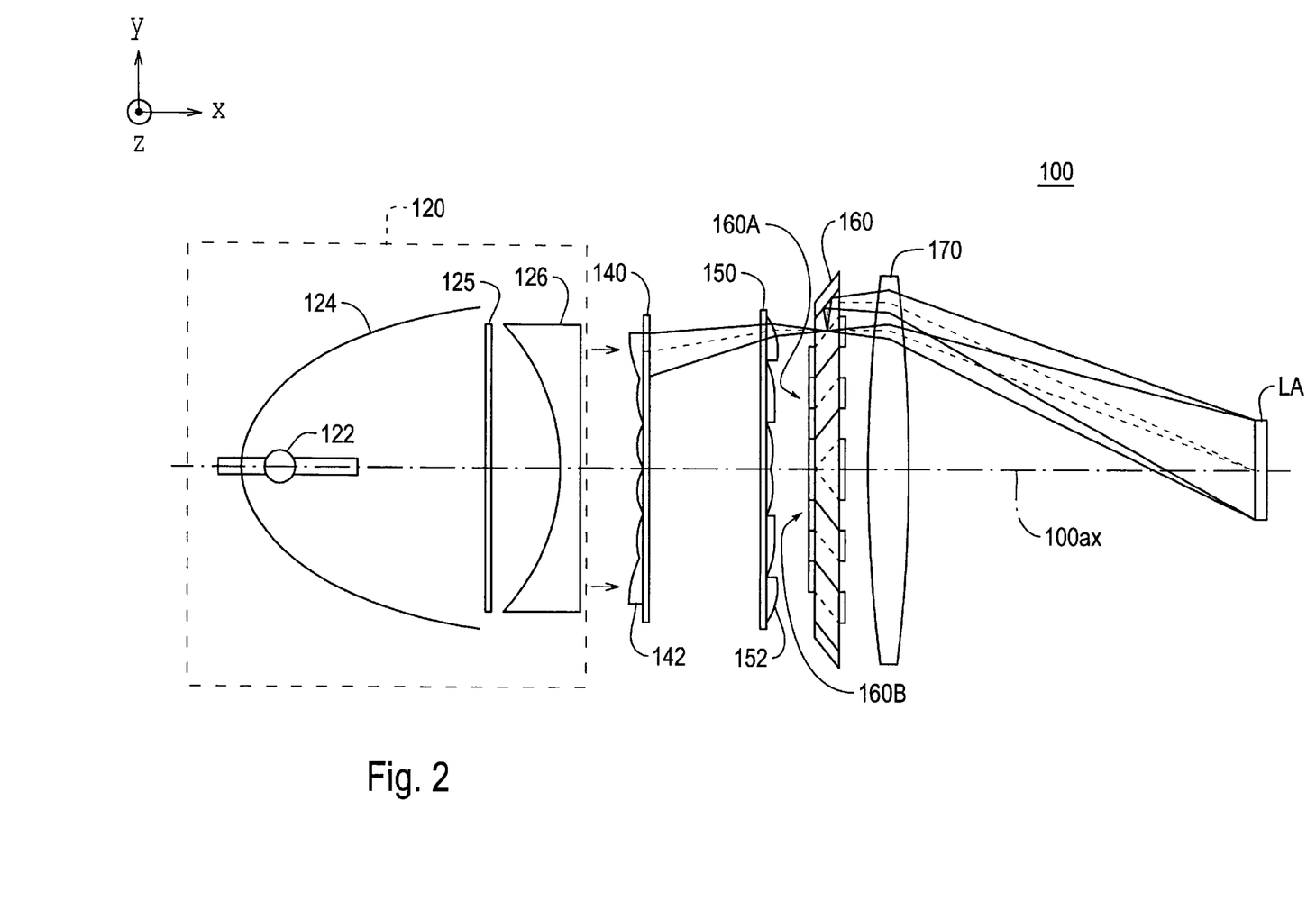
FIG. 2 is an enlarged schematic of an illumination optical system 100 shown in FIG. 1.

FIG. 2 illustrates the illumination optical system 100 shown in FIG. 1 in enlarged form. The illumination optical system 100 includes a light source device 120, first and second lens arrays 140 and 150, a polarization generation optical system 160, and a superimposing lens 170. Each of the optical parts is disposed with reference to a system optical axis 100ax. The system optical axis 100ax is the center axis of light beams that exit from the light source device 120. In FIG. 2, an illumination area LA that the illumination optical system 100 illuminates corresponds to the liquid crystal light valves 300R, 300G, and 300B shown in FIG. 1.

The light source device 120 includes a lamp 122, a reflector 124 having an ellipsoid-of-revolution concave surface, and a collimating lens 126. The lamp 122 is disposed near the first focal point of the ellipsoid-of-revolution surface of the reflector 124. The light that exits from the lamp 122 is reflected by the reflector 124, and the reflected light travels towards a second focal point of the reflector as it converges. The collimating lens 126 converts the converged light beams incident thereupon into light beams that are substantially parallel to the system optical axis 100ax.

The light source device 120 includes an ultraviolet-ray removing filter 125 disposed at a light-incident-surface side of the collimating lens 126. The ultraviolet-ray removing filter 125 removes ultraviolet rays from the light that exits from the lamp 122 of the light source device 120. This makes it possible to reduce deterioration of the optical parts (such as the polarizers provided at the liquid crystal light valves), formed of organic materials, caused by ultraviolet rays. Instead of using the ultraviolet-ray removing filter 125, an ultraviolet-ray removing film may be formed on the light-exiting surface of the collimating lens 126.

A reflector having a paraboloid-of-revolution concave surface may be used as the light source device 120. In this case, since the light reflected by the reflector is substantially parallel to the system optical axis 100ax, the collimating lens 126 can be omitted.

The first and second lens arrays 140 and 150 include a plurality of small lenses 142 and 152, disposed in a matrix-like arrangement, respectively. The first lens array 140 functions to divide the substantially parallel light beams that exit from the light source device 120 into a plurality of partial light beams, and to cause them to exit therefrom. The second lens array 150 functions to cause center axes of the corresponding partial light beams that exit from the first lens array 140 to be substantially parallel to the system optical axis 100*ax*. Along with the superimposing lens 170, the second lens array 150 functions to form an image produced by each of the small lenses 142 of the first lens array 140 on the illumination area LA.

Each of the small lenses 142 and 152 is a plano-convex decentered lens, whose external shape, as viewed from the x direction, is set so as to be substantially the same as the shape of the illumination area LA (liquid crystal light valves). However, as shown in FIG. 2, decentered lenses that are decentered differently are used for the first small lenses 142 and the second small lenses 152. More specifically, the small lens 142 of the first lens array 140 at the outermost periphery thereof is decentered so that the chief ray of the divided partial light beams travels obliquely with respect to the system optical axis 100*ax*. The small lens 152 of the second lens array 150 at the outermost periphery thereof is decentered so that the chief ray of the partial light beams that are obliquely incident upon the system optical axis 100*ax* is substantially parallel to the system optical axis 100*ax*.

As shown in FIG. 2, the partial light beams that exit from each of the small lenses 142 of the first lens array 140 pass through each of the small lenses 152 of the second lens array 150 and converge near the location of the small lenses 152, that is, within the polarization generation optical system 160.

The polarization generation optical system 160 includes two integrally formed polarization generation element arrays 160A and 160B. The first and second polarization generation element arrays 160A and 160B are disposed so as to be symmetrical with respect to the system optical axis 100*ax*.

Figure 3A:
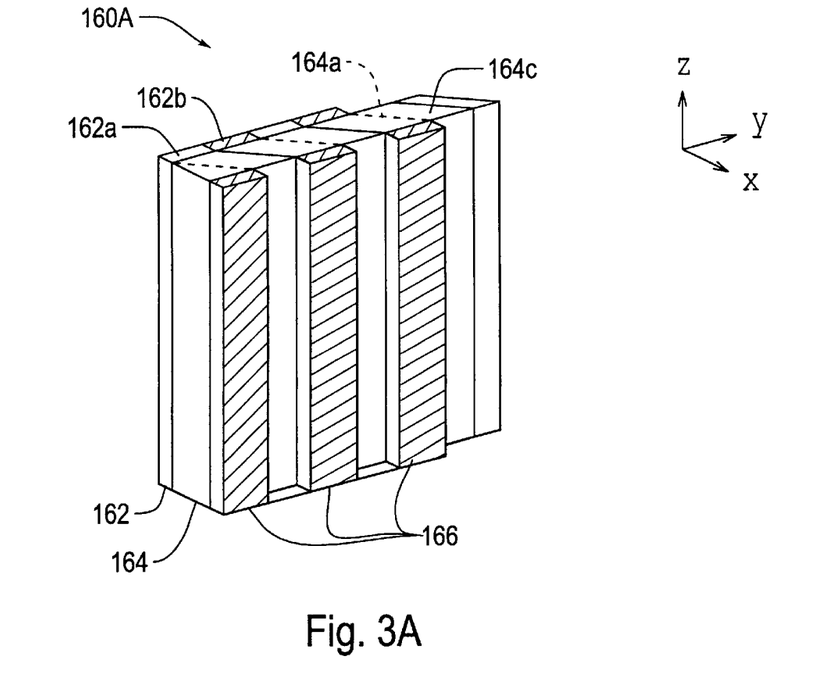
FIGS. 3(A) and 3(B) are an enlarged perspective view and schematic that illustrate a first polarization generation element array 160A shown in FIG. 2 in enlarged form.
Figure 3B:
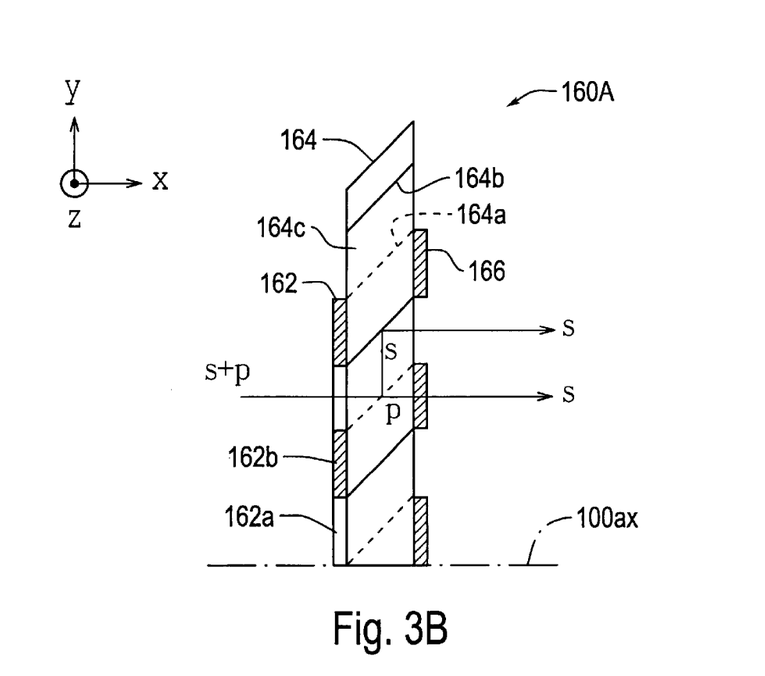

FIGS. 3(A) and 3(B) illustrate in enlarged form the first polarization generation element array 160A shown in FIG. 2. FIG. 3(A) is a perspective view of the first polarization generation element array 160A, and FIG. 3(B) is a plan view thereof as viewed from the +z direction. The polarization generation element array 160A includes a light-shielding plate 162, a polarization beam splitter array 164, and a plurality of λ/2 retardation films 166 that are selectively disposed at a light-exiting surface of the polarization beam splitter array 164. This description similarly applies to the second polarization generation element array 160B.

As shown in FIGS. 3(A) and 3(B), the polarization beam splitter array 164 is formed by bonding a plurality of columnar glass members 164*c* that are substantially parallelogrammic in cross section. Polarization separation films 164*a* and reflective films 164*b* are alternately formed at the interfaces between the corresponding glass members 164*c*. Dielectric multilayer films are used as the polarization separation films 164*a*, and dielectric multilayer films or metallic films are used as the reflective films 164*b*.

The light-shielding plate 162 is formed by disposing open surfaces 162*a* and light-shielding surfaces 162*b* in a stripe-like arrangement. The open surfaces 162*a* and the light-shielding surfaces 162*b* are provided in correspondence with the polarization separation films 164*a* and the reflective films 164*b*, respectively. Therefore, the partial light beams that exit from the first lens array 140 (FIG. 2) are incident only upon the polarization separation films 164*a* of the polarization beam splitter array 164 through the open surfaces 162*a*, and are not incident upon the reflective films 164*b*. A flat transparent member (such as a glass plate) having light-shielding films (such as chromium films, aluminum films, or dielectric multilayer films) selectively formed thereon may be used. In addition, a light-shielding flat plate, such as an aluminum plate, having stripe-like open portions may be used for the light-shielding plate 162. Further, light-shielding films may be directly formed on the glass members 164*c* of the polarization beam splitter array 164.

As shown by a solid line illustrated in FIG. 3(B), the chief ray (center axis) of each of the partial light beams that exit from the first lens array 140 (FIG. 2) is incident upon its corresponding open portion 162*a* of the light-shielding plate 162 substantially parallel to the system optical axis 100*ax*. The partial light beams that pass through the corresponding open surfaces 162*a* are divided into s-polarized partial light beams and p-polarized partial light beams by the polarization separation films 164*a*. The p-polarized partial light beams pass through the polarization separation films 164*a*, and exit from the polarization beam splitter array 164. On the other hand, after the s-polarized partial light beams are reflected by the polarization separation films 164*a*, and are then reflected by the reflective films 164*b*, they exit from the polarization beam splitter array 164. At the light-exiting surface of the polarization beam splitter array 164, the p-polarized partial light beams and the s-polarized partial light beams are substantially parallel to each other.

The λ/2 retardation films 166 are only formed on the portions of the light-exiting surface of the polarization beam splitter array 164 from which the p-polarized partial light beams that pass through the polarization separation films 164*a* exit. The λ/2 retardation films 166 function to convert incident linearly polarized light beams into linearly polarized light beams having perpendicular polarization directions. Therefore, the p-polarized partial light beams are converted into s-polarized partial light beams by the λ/2 retardation films 166, and the converted s-polarized partial light beams exit therefrom. Accordingly, the unpolarized partial light beams (s+p) that impinge upon the polarization generation element array 160A are converted into s-polarized partial light beams and the resulting light beams are made to exit therefrom. By disposing the λ/2 retardation films 166 only at the portions of the surface from which the s-polarized partial light beams exit, it is possible to convert the partial light beams that are incident upon the polarization generation element array 160A into p-polarized partial light beams and to cause them to exit therefrom.

As described above, the plurality of partial light beams that exit from the first lens array 140 are divided into two partial light beams by the polarization generation optical system 160, and are converted into substantially one type of linearly polarized light beams that have the same polarization directions, respectively. The plurality of partial light beams that have the same polarization directions are superimposed on the illumination area LA by the superimposing lens 170 shown in FIG. 2. At this time, the distribution of the intensity of light that illuminates the illumination area LA is substantially uniform.

As described above, the illumination optical system 100 (FIG. 1) causes illumination light (s-polarized light beams) having the same polarization directions to exit therefrom, and illuminates the liquid crystal light valves 300R, 300G, and 300B through the color light separation optical system 200 and the relay optical system 220.

Figure 4A:
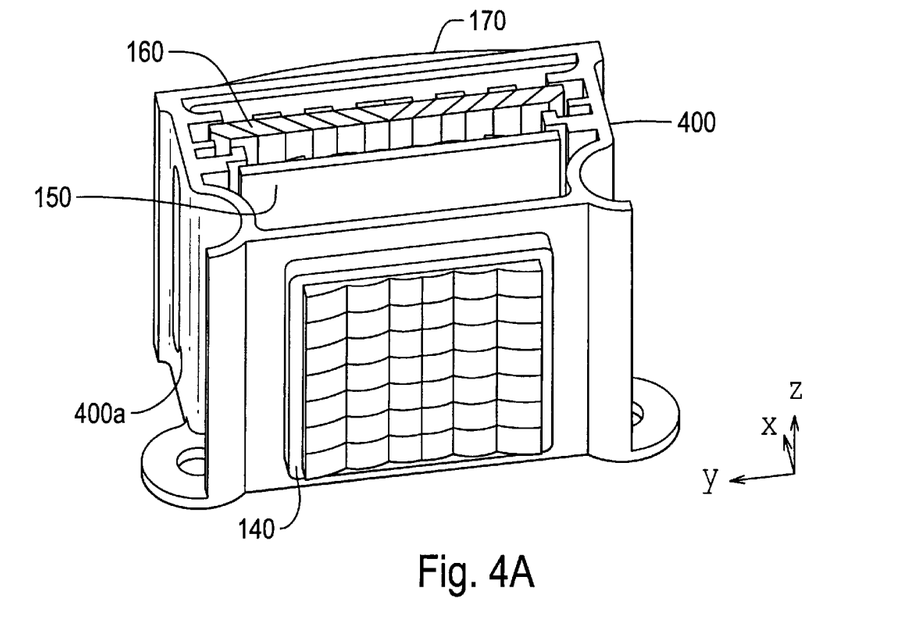
FIGS. 4(A) and 4(B) are perspective views that illustrate a base frame 400 to which a plurality of optical parts that are included in the illumination optical system 100 are mounted.
Figure 4B:
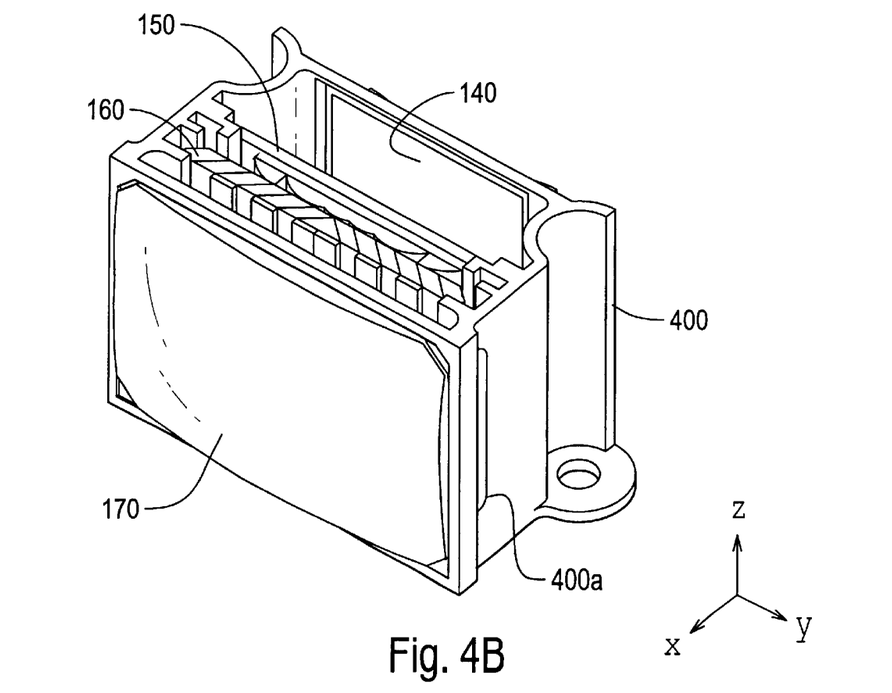

FIGS. 4(A) and 4(B) illustrate a base frame 400 in which a plurality of optical parts included in the illumination optical system 100 are mounted. The first and second lens arrays 140 and 150, the polarization generation optical system 160, and the superimposing lens 170 are mounted in the base frame 400 of the embodiment. FIG. 4(A) is a perspective view of the base frame 400 viewed from the first lens array 140 side; and FIG. 4(B) is a perspective view of the base frame 400 viewed from the superimposing lens 170 side. As can be seen from FIG. 4(B), the superimposing lens 170 has a substantially rectangular external shape when an end portion of a lens having a substantially circular external shape is cut off.

The base frame 400 is integrally formed using one type of material (a metallic material or a heat-resistant resin material). An Mg alloy may, for example, be used as the metallic material. PPS (polyphenylene sulfide) or UP (unsaturated polyester resin) that can be subjected to injection molding may, for example, be used as the heat-resistant resin material. When such materials are used, the heat resistance of the base frame 400 can be increased, and the weight of the base frame 400 can be made to be relatively small. In addition, when metallic materials are used, the wall thickness of the base frame 400 can be made to be relatively small.

Figure 5A:
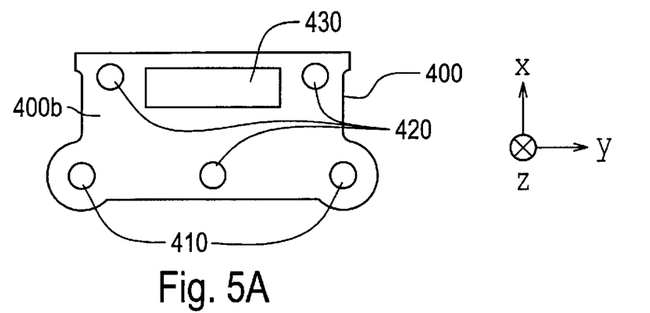
FIGS. 5(A) to 5(E) are plan views that show the base frame 400 (FIGS. 4(A) and 4(B)) having no optical parts mounted thereto, as viewed from various directions.
Figure 5B:
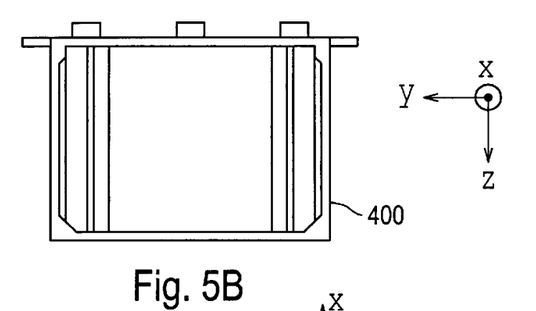
Figure 5C:
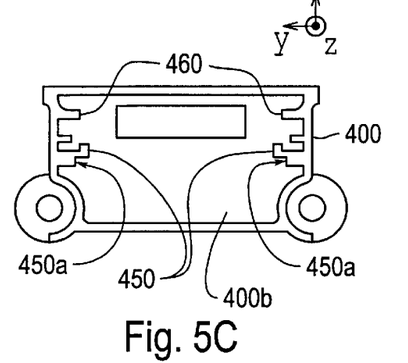
Figure 5D:
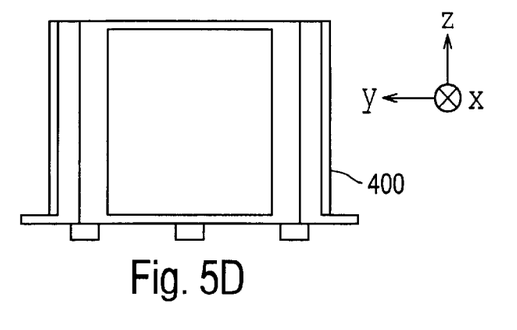
Figure 5E:
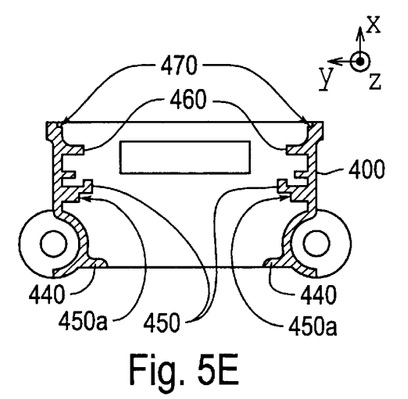

FIGS. 5(A) to 5(E) show the base frame 400 (FIG. 4) having no optical parts mounted therein, viewed from various directions. FIGS. 6(A) to 6(E) show the base frame 400 (FIG. 4) having optical parts mounted therein, as viewed from various directions. FIGS. 5(A) and 5(C) are a bottom view and a top view of the base frame 400 as viewed from the z direction, respectively. FIG. 5(E) is a sectional view of the base frame 400 when the base frame 400 is cut parallel to a xy plane. FIGS. 5(B) and 5(D) are side views when viewed from the x direction, with the side surface shown in FIG. 5(B) being a light-exiting surface, and the side surface shown in FIG. 5(D) being a light-incident surface. FIGS. 6(A) to 6(E) correspond to FIGS. 5(A) to 5(E).

As shown in FIGS. 5(A) to 5(E), the base frame 400 has a substantially rectangular parallelepiped external shape. As shown in the top views of FIGS. 5(C) and 6(C), the base frame 400 has an open surface to enable insertion of the optical parts into the base frame 400 from above (z direction). Open portions that pass light therethrough are formed in the light-exiting surface shown in FIG. 5(B) and the light-incident surface shown in FIG. 5(D). As shown in FIGS. 5(C) and 5(E) and FIGS. 6(C) and 6(E), recesses 470 and protrusions 440, 450 and 460 that define the location of each of the optical parts 140, 150, 160, and 170 are formed at the base frame 400, from a top surface to a bottom surface 400b of the base frame 400 so as to extend into the base frame 400. These protrusions and recesses are provided in pairs at opposing surfaces of the base frame 400. In this way, when mounting portions (location defining portions) of the base frame 400 are formed by recesses and protrusions, the base frame can be formed to have a relatively simple structure.

While a light-exiting-surface-side planar end portion of the first lens array 140 is in contact with the first protrusions 440, which are provided so as to protrude into the base frame 400, the first lens array 140 is secured so as to cover the light-incident-surface-side open portion of the base frame 400. While a light-exiting-surface-side planar end portion of the second lens array 150 is in contact with the stepped second protrusions 450 of the base frame 400, the second lens array 150 is secured. The polarization generation optical system 160 is also secured while a light-exiting-surface-side end portion of the polarization generation optical system 160 is in contact with the third protrusions 460 of the base frame 400. The superimposing lens 170 is secured while the periphery thereof is embedded in the recesses 470 of the base frame 400.

In the embodiment, each of the optical parts is mounted to the base frame 400 in the following order, for example. First, the base frame 400 is set at an assembly jig (not shown), and, with the recesses 470 of the base frame 400 facing an upward direction, the base frame 400 is held. Then, the superimposing lens 170 is placed in the base frame 400 so that an end portion thereof is fitted to the recesses 470. At this time, the location of the superimposing lens 170 is adjusted in the x-axis direction and the y-axis and z-axis directions using an adjusting jig (not shown) so that the substantially parallel light beams that exit from the lamp 122 side (see FIG. 2) form an image at the center of the illumination area LA through the superimposing lens 170 in order to secure the superimposing lens 170 and the base frame 400 with an adhesive. It is preferable to use heat-resistant adhesives, such as UV curable resin or thermosetting resin. Thereafter, the base frame 400 is inverted in the vertical direction in order to hold the base frame 400, while the superimposing lens 170 faces a downward direction.

Then, the second lens array 150 is inserted into the base frame 400 from the z direction (from the open surface shown in FIG. 5(C)) and is placed on the stepped protrusions 450. At this time, the location of the second lens array 150 in the y direction is mechanically determined by positioning surfaces 450a shown in FIG. 5(C), and the location of the second lens array 150 in the z direction is mechanically determined by a bottom surface 400b of the base frame 400 in order to secure the second lens array 150 and the base frame 400 with an adhesive. Although in FIG. 6(C) the positioning surfaces 450a and the side surfaces of the second lens array 150 are shown as being separated with considerably wide gaps, there are actually almost no gaps therebetween. Then, the first lens array 140 is placed at the protrusions 440 of the base frame 400. Thereafter, the first lens array 140 is adjusted so that the central axis of the chief ray of each of the partial light beams that exit from each of the small lenses 142 of the first lens array 140 passes through the center of the illumination area LA through the second lens array 150 and the superimposing lens 170. Then, the first lens array 140 is secured to the base frame 400 with an adhesive. Lastly, the polarization generation optical system 160 is inserted into the base frame 400 from the z direction and is placed at the protrusions 460. The polarization generation optical system 160 is adjusted so that intensity of light becomes maximum when the substantially parallel light beams that impinge upon the first lens array 140 exit from the superimposing lens 170. More specifically, the location of the polarization generation optical system 160 in the y direction shown in FIG. 6(C) is subjected to a fine adjustment using an adjusting jig (not shown) that is inserted from two adjusting holes 400a, formed in the side walls of the base frame 400 shown in FIG. 4(B). Accordingly, the location of the polarization generation optical system 160 is determined, and the polarization generation optical system 160 is secured to the base frame 400 with an adhesive.

The adjustment of the location of each of the optical parts 140, 150, 160 and 170 can be optically performed using, for example, the substantially parallel light beams that exit from the lamp 122 side, or can be mechanically performed. In the embodiment, only the second lens array 150 is aligned mechanically. If it is optically adjusted, it can be positioned more precisely. When an optical adjustment is performed, there is an advantage that the state of the illumination optical system 100 being used can be simulated.

Figure 6A:
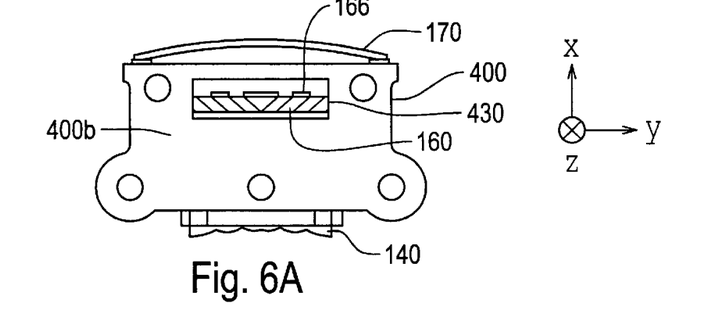
FIGS. 6(A) to 6(E) are plan views that show the base frame 400 (FIGS. 4(A) and 4(B)) having optical parts mounted thereto, as viewed from various directions.
Figure 6B:
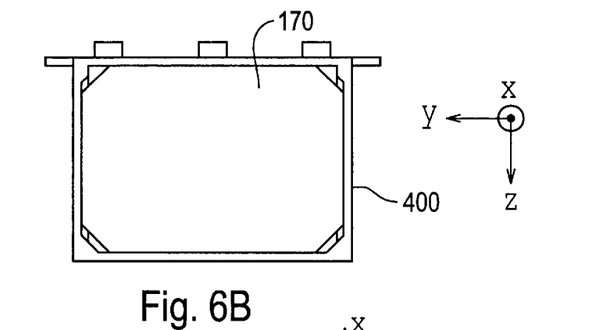
Figure 6C:
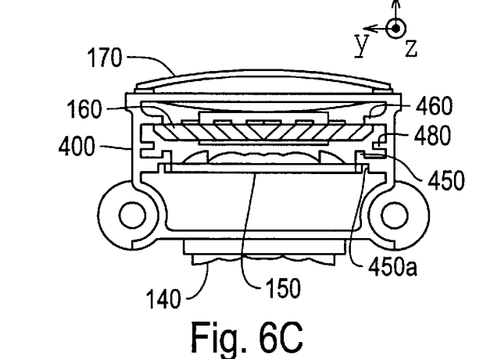
Figure 6D:
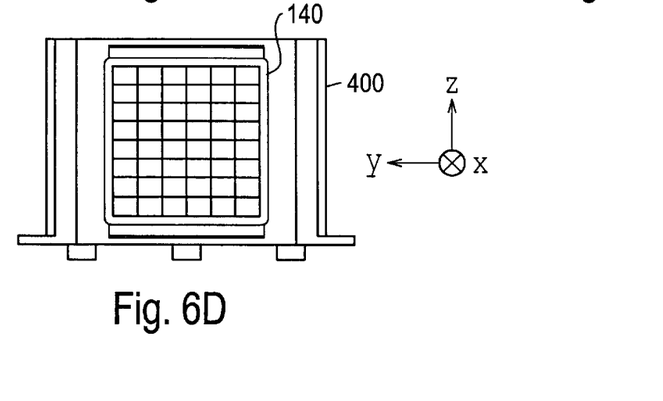
Figure 6E:
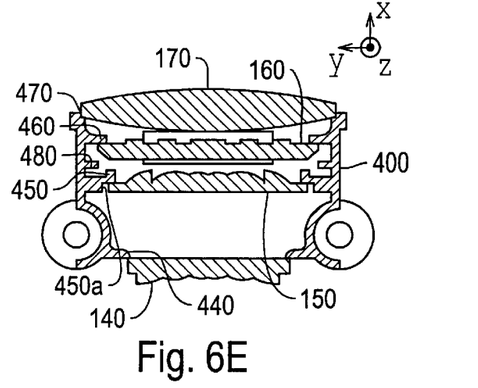

As shown in the bottom views of FIGS. 5(A) and 6(A), a substantially rectangular ventilation hole 430 is formed in the bottom surface 400b of the base frame 400. In the embodiment, the ventilation hole 430 is provided at a location where the polarization generation optical system 160 is mounted. In this way, temperature rises of the λ/2 retardation films 166 of the polarization generation optical system 160 can be reduced.

The base frame 400 is provided with two mounting holes 410 and three mounting pins 420. The mounting holes 410 and the mounting pins 420 are used when the base frame 400 for the illumination optical system 100 is mounted to a common base frame (general base member) to mount all of the optical parts included in the projector 1000 (FIG. 1). More specifically, the three mounting pins 420 are used for engagement with mounting holes that are formed in the general base frame for the projector, so that the base frame 400 for the illumination optical system is disposed substantially in a predetermined location of the general base frame. The two mounting holes 410 are used to screw the base frame 400 for the illumination optical system and the general base frame to each other. The base frame 400 may be secured to the general base frame with an adhesive without forming the mounting holes 410. When a cover member to cover the general base frame is used, the base frame 400 may be pushed against and secured to the general base frame using a frame member as a result of placing a resilient member between the cover member and the base frame 400.

Figure 7:
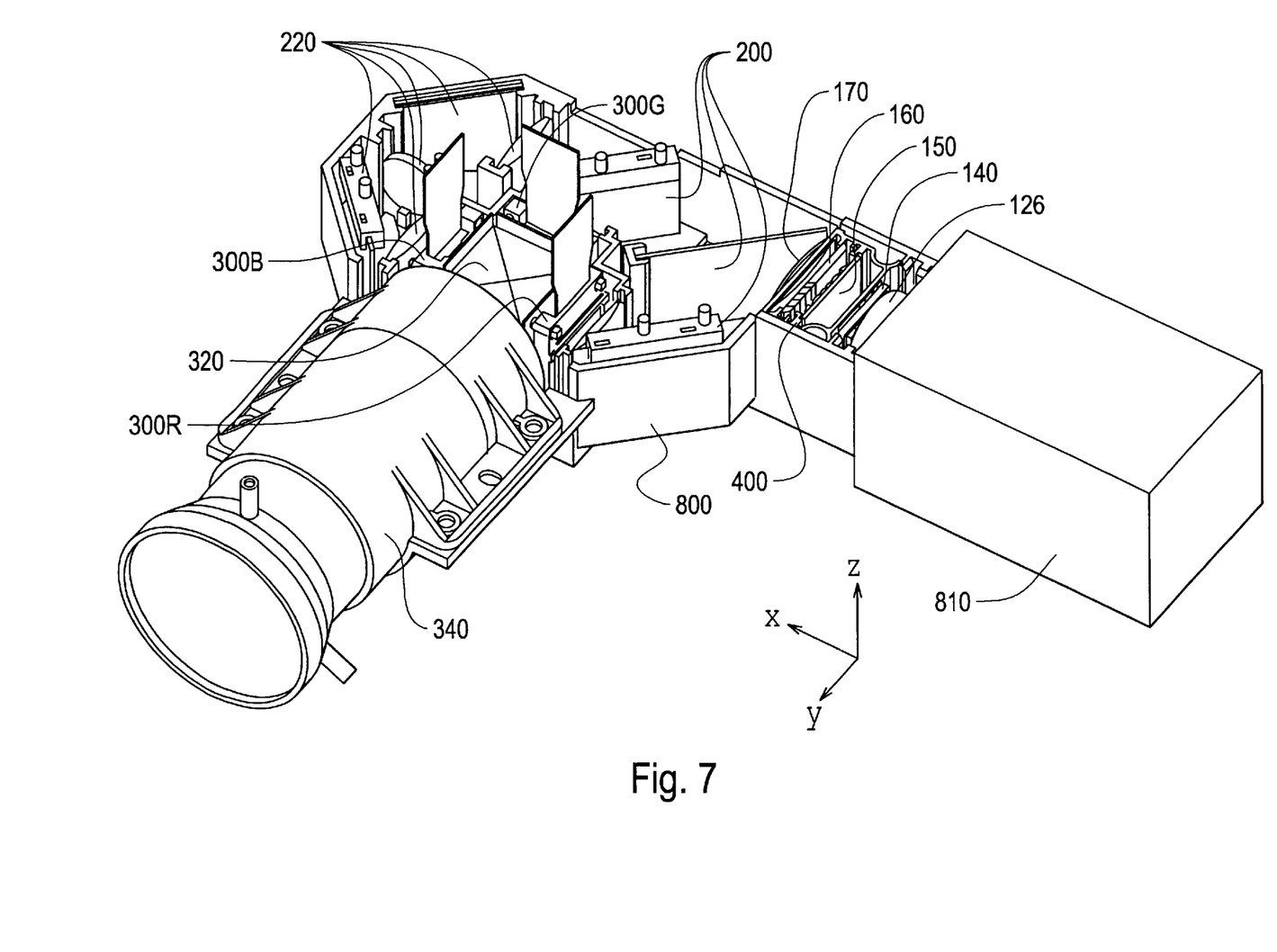
FIG. 7 is a perspective view that shows a state in which the base frame 400 for the illumination optical system 100 is mounted to a base frame 800 for the projector.

FIG. 7 shows a state in which the base frame 400 for the illumination optical system 100 is mounted to a base frame (general base frame) 800 for the projector. As shown in FIG. 7, all of the optical parts including the color light separation optical system 200, the relay optical system 220, the liquid crystal light valves 300R, 300G, and 300B, the cross dichroic prism 320, and the projection optical system 340 are mounted to the general base frame 800. The base frame 400, to which a plurality of optical parts included in the illumination optical system 100 are mounted, is mounted to the general base frame 800. A ventilation hole (not shown) is formed in a portion of the general base frame 800 that corresponds to the location of the ventilation hole 430 (FIGS. 5(A) and 6(A)) that is formed in the base frame 400 for the illumination optical system. Of the parts of the illumination optical system 100, the ultraviolet-ray removing filter 125 and the collimating lens 126, which are included in the light source device 120, are directly mounted to the general base frame 800. The lamp 122 and the reflector 124, which are included in the light source device 120, are mounted inside a case 810, which is disposed at an end of the general base frame 800.

As described above, in the embodiment, the base frame 400 for the illumination optical system 100 is provided separately of the base frame 800 for the entire projector. Here, the base frame 400 of the embodiment has a substantially rectangular parallelepiped external shape including a pair of first side surfaces that are perpendicular in the x direction, a pair of second side surfaces that are perpendicular in the y direction, and a pair of third side surfaces that are perpendicular in the z direction, with these directions being shown in FIGS. 4(A) and 4(B). An opening for light that passes through each of the optical parts is formed in the pair of first side surfaces. A recess or a protrusion is formed at the inner sides of the pair of second side surfaces in a direction perpendicular to the pair of third side surfaces. At least one of the pair of third side surfaces opens to the outside. By using the base frame 400, aligning of each of the optical parts of the illumination optical system 100 alone can be separately performed, so that aligning of the optical parts of the illumination optical system 100 can be easily performed.

Figure 8:
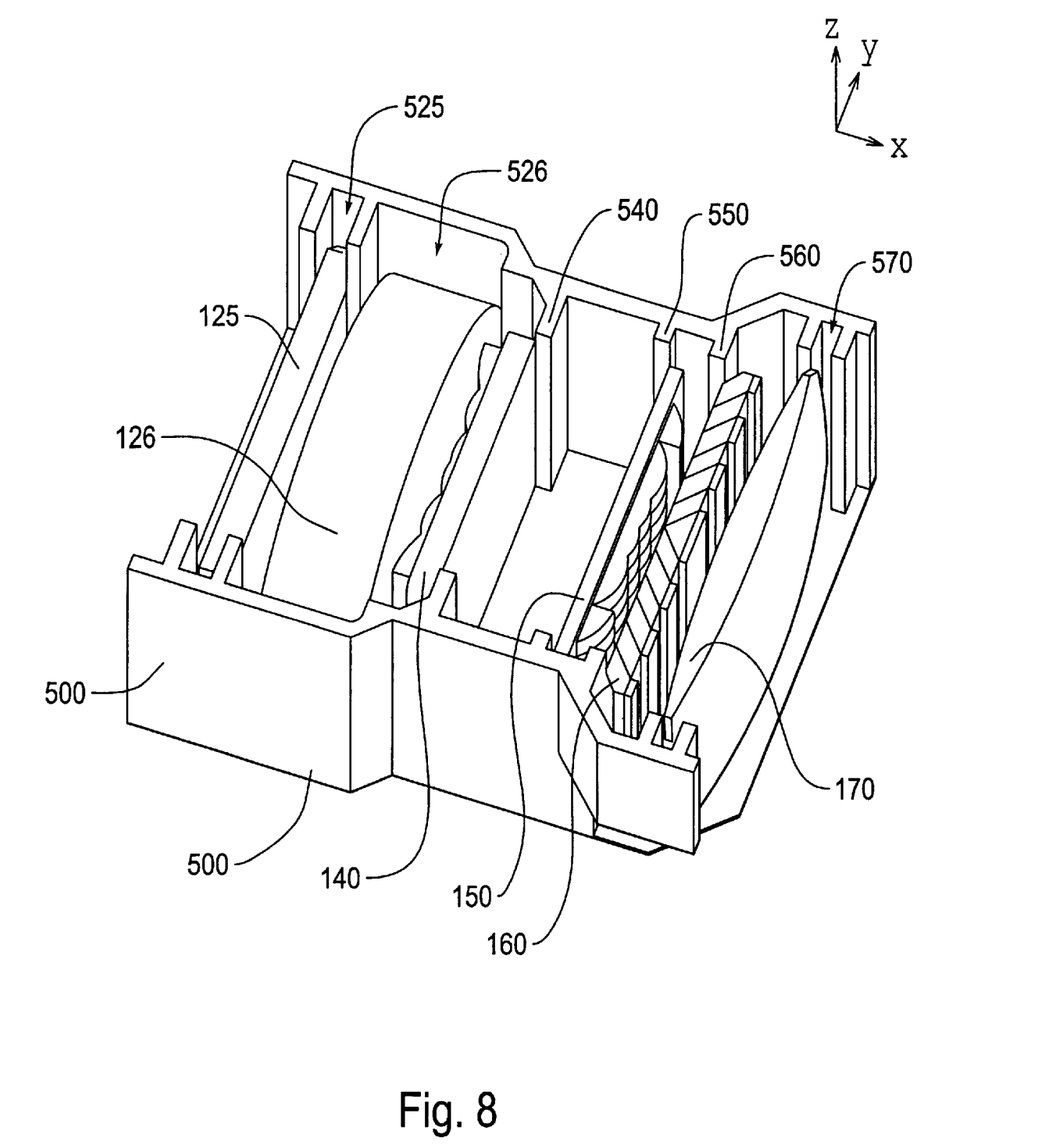
FIG. 8 is a perspective view that illustrates a base frame 500 for the illumination optical system 100 of a second embodiment of the present invention.

B. Second Embodiment:

FIG. 8 illustrates a base frame 500 for the illumination optical system 100 of a second embodiment of the present invention. A plurality of optical parts included in the illumination optical system 100 are also mounted to the base frame 500. More specifically, of the optical parts of the illumination optical system 100, the ultraviolet-ray removing filter 125 and the collimating lens 126 included in the light source device 120, the first and second lens arrays 140 and 150, the polarization generation optical system 160, and the superimposing lens 170 are mounted to the base frame 500.

The base frame 500 has a substantially rectangular parallelepiped external shape. In the same way as the base frame 400 shown in FIGS. 4(A) to 6(E), the base frame 500 has an open surface to enable insertion of each of the optical parts into the base frame 500 from above (the z direction). A plurality of protrusions 540 and 550 and recesses 525, 526 and 570 that define the locations of the optical parts are formed at the base frame 500 so as to extend inward. In the same way as the base frame 400, open portions are formed in a light-incident surface and a light-exiting surface of the base frame 500.

As shown in FIG. 8, the first lens array 140 is secured, while the light-exiting-surface-side planar end portion of the first lens array 140 is in contact with the first protrusions 540, which are provided so as to protrude into the base frame 500. The second lens array 150 is secured while the light-incident-surface-side planar end portion of the second lens array 150 is in contact with the second protrusions 550. The polarization generation optical system 160 is also secured while the light-incident-surface-side end portion of the polarization generation optical system 160 is in contact with the third protrusions 560.

The ultraviolet-ray removing filter 125 is inserted into the recesses 525, which are formed by one set of protrusions formed at the light-incident-surface side and the light-exiting-surface side of the ultraviolet-ray removing filter 125, and is secured to the base frame 500 while it is fitted in the recesses. Similarly, the collimating lens 126 and the superimposing lens 170 are secured while they are fitted in the recesses 526 and recesses 570, which are formed by corresponding sets of protrusions, respectively. In this way, the optical parts can be aligned simply by being fitted into the recesses. However, since there are manufacturing errors in the base frame and the optical parts, respectively, it is preferable to provide gaps to eliminate positional shift caused by the manufacturing errors in a direction parallel to the light-incident surface (or the light-exiting-surface) of each of the optical parts.

In the embodiment, each of the ultraviolet-ray removing filter 125, the collimating lens 126, and the superimposing lens 170 is mounted with the light-incident-surface side and the light-exiting-surface side of each of these component parts sandwiched between the recesses corresponding thereto. On the other hand, the first lens array 140, the second lens array 150, and the polarization generation optical system 160 are mounted so that the light-incident surface or the light-exiting surface of each of these component parts contacts its corresponding protrusions. As in the latter case, when the optical parts are mounted so that the mounting portions contact the light-incident surface or the light-exiting surface of each of the optical parts, the degree of freedom in adjusting the locations of the optical parts can be made to be considerably large.

After aligning each of the optical parts, each of the optical parts is secured to the base frame 500 with an adhesive. The base frame 500 is mounted to the base frame for the projector in the same way as the base frame 400 of the first embodiment.

C. Third Embodiment:

In the first and second embodiments, the illumination optical system 100 includes the first and second lens arrays 140 and 150. In such a case, a lens array unit that is formed by integrally forming the first and second lens arrays 140 and 150 may be used.

Figure 9:
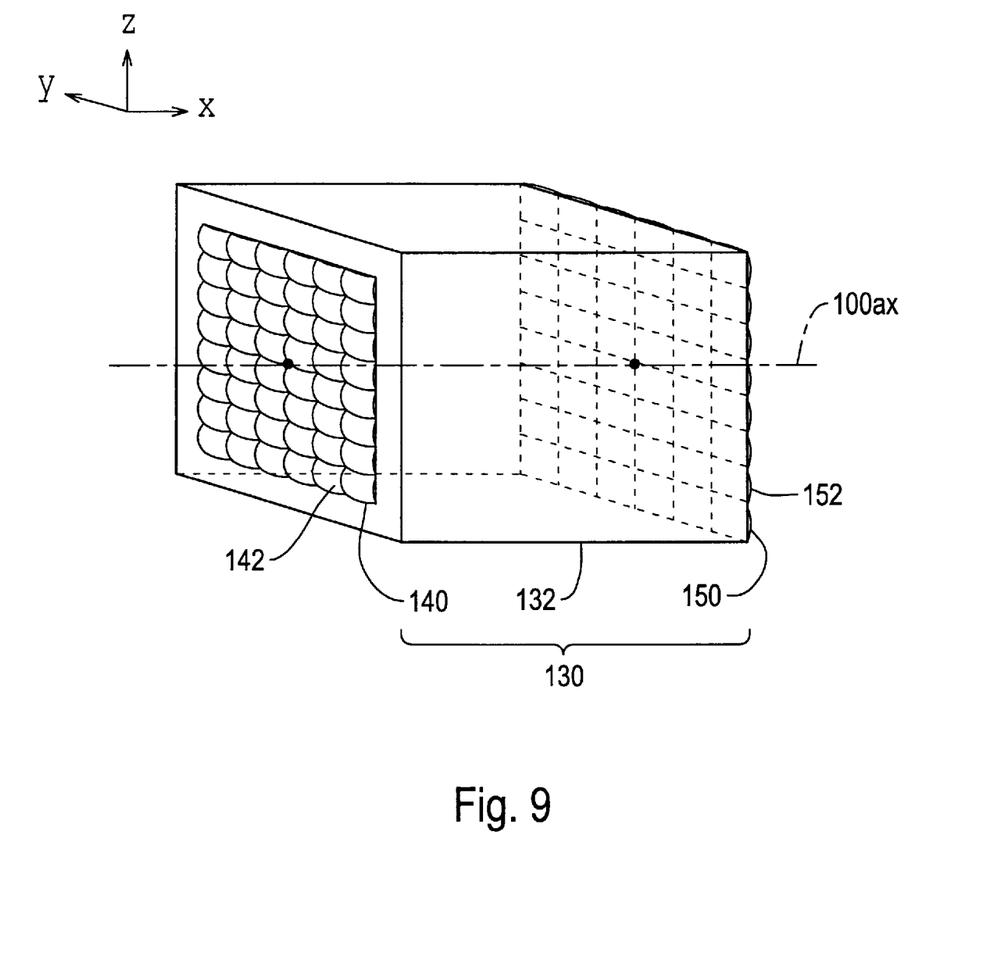
FIG. 9 is a perspective view that illustrates a lens array unit 130.

FIG. 9 illustrates a lens array unit 130. The lens array unit 130 includes the first and second lens arrays 140 and 150 and a light-transmissive portion 132 that joins the first and second lens arrays and that is used to guide light from the first lens array to the second lens array.

Although the lens array unit 130 used in the third embodiment is fabricated by integrally molding molten glass, the lens array unit 130 may be fabricated by etching a prefabricated glass block with fluorinated acid, or by grinding it.

The lens array unit 130 may be integrally formed by separately providing the first and second lens arrays 140 and 150 and the light-transmissive portion 132 and bonding them together.

Figure 10:
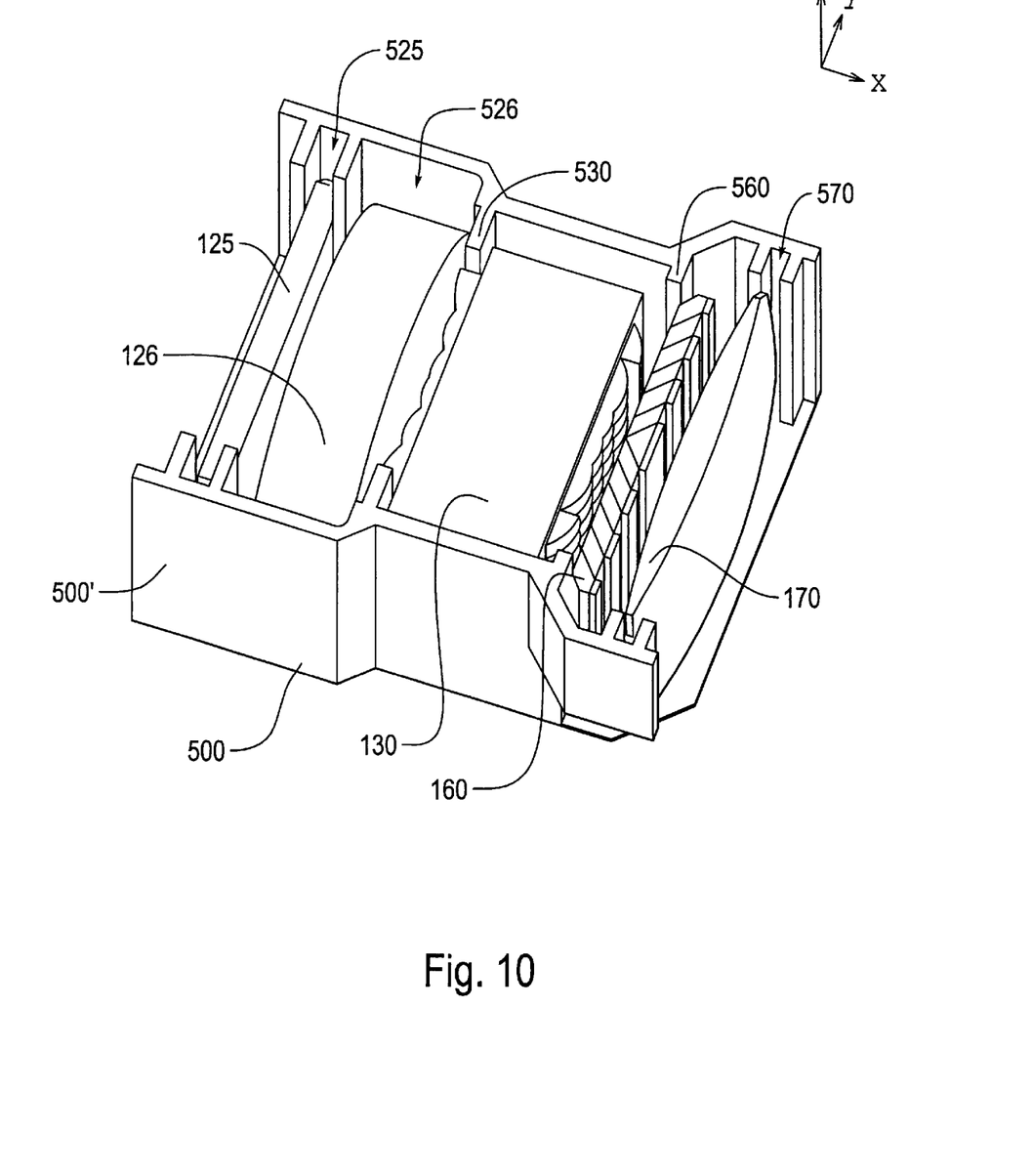
FIG. 10 is a perspective view that illustrates a base frame 500' for the illumination optical system 100 of a third embodiment of the present invention.
Figure 11A:
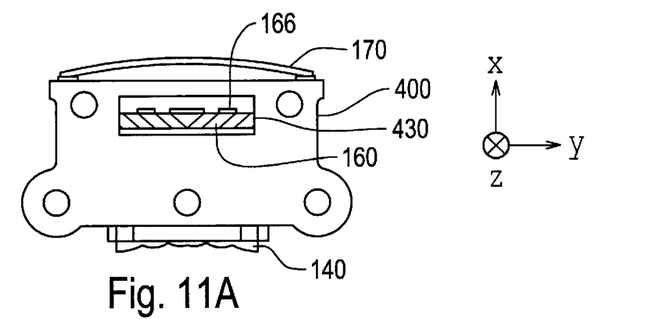
FIGS. 11(A) to 11(E) are plan views that illustrate the base frame 400 (FIGS. 4(A) and 4(B)) in which a light-shielding plate is separately mounted, as viewed from various directions.
Figure 11B:
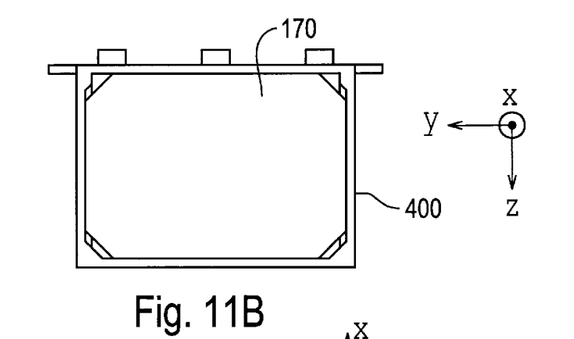
Figure 11C:
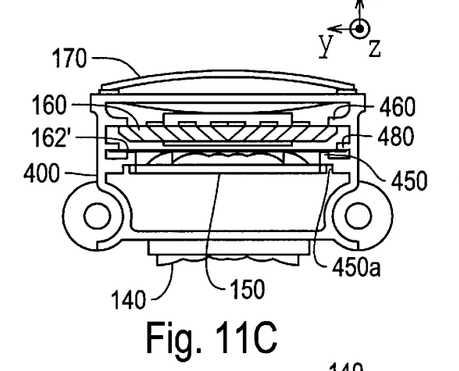
Figure 11D:
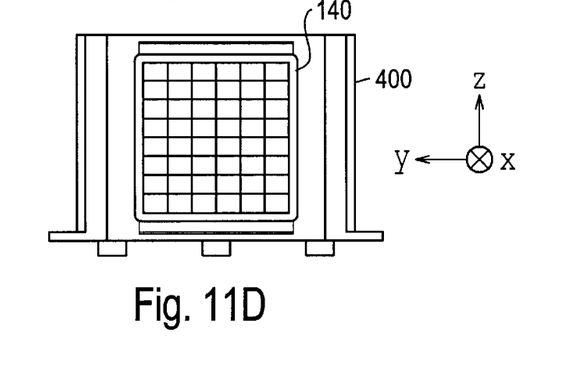
Figure 11E:
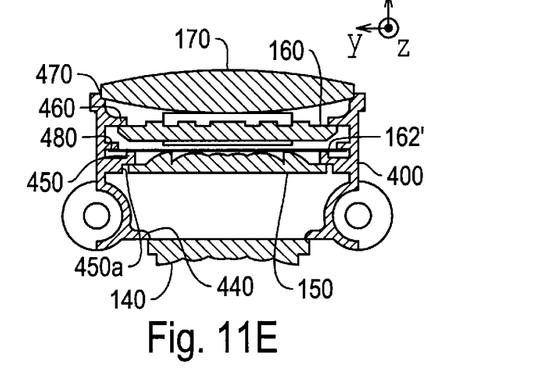

FIG. 10 illustrates a base frame 500' for the illumination optical system 100 of a third embodiment of the present invention. The base frame 500' is substantially the same as the base frame 500 (FIG. 8) of the second embodiment, except that the integrally formed lens array unit 130 is mounted thereto in place of the separately formed first and second lens arrays 140 and 150.

As can be seen by comparing FIGS. 8 and 10, the base frame 500' includes protrusions 530 that mount the lens array unit 130 thereto in place of the protrusions 540 and 550 that separately mount the corresponding first and second lens arrays 140 and 150. The lens array unit 130 is secured, while a light-incident-surface side end portion of the lens array unit 130 is in contact with the protrusions 530 of the base frame 500'.

When, as mentioned above, the lens array unit 130 is used, in assembling the illumination optical system 100, it is possible to obviate performing aligning operations, such as axial alignment, concerning the relationship between the first and second lens arrays 140 and 150. In addition, when the lens array unit 130 is used, the relationship between the other optical parts of the illumination optical system 100 and the integrally formed lens array unit 130 only needs to be adjusted, so that aligning each optical part of the illumination optical system 100 can easily be performed.

The advantages of using the lens array unit 130 become more noticeable when the illumination optical system 100 is reduced in size. More specifically, in reducing the size of the illumination optical system 100, it is necessary to precisely align the two lens arrays 140 and 150. However, since, in this case, it is not necessary to align the two lens arrays in relation to each other, aligning each optical part of the illumination optical system 100 can be performed very easily.

The present invention is not limited to the above-described embodiments and practical forms. The present invention can be performed in various modes while not departing from the scope and gist of the present invention. For example, the following modifications are possible.

(1) Although in the above-described embodiments the illumination optical system 100 includes the second lens array 150, the second lens array 150 does not need to be provided. In such a case, small lenses that are not decentered are used as the small lenses 142 of the first lens array 140.

In addition, although in the above-described embodiments the superimposing lens 170 is provided, the superimposing lens 170 can be omitted in case that the second lens array 150 has a superimposing function. More specifically, the degree of decentering the small lenses 152 of the second lens array 150 is changed.

Further, although in the above-described embodiments the polarization generation optical system 160 is provided, this element can be omitted. However, when the polarization generation optical system 160 is used, there is an advantage that light which exits from the light source device 120 can be used efficiently.

Accordingly, in general, the illumination optical system includes a light source device, a lens arrays that divides light beams that exit from the light source device into a plurality of partial light beams, and a superimposing optical system that superimpose the plurality of partial light beams onto the predetermined illumination area.

(2) Although in the above-described embodiments the base frames 400, 500, and 500' do not include mounting portions that mount thereto the lamp 122 and the reflector 124, included in the light source device 120, these mounting portions may be provided.

Although in the above-described embodiments the illumination optical system 100 is constructed so that light travels in one direction after having exited from the reflector 124, the direction of travel of the light can be changed in the light path extending from the light source device 120 to the superimposing lens 170. For example, a mirror may be added as a result of disposing the first and second lens array being perpendicular to each other. In this case, the plurality of partial light beams that exit from the first lens array are incident upon the second lens array after being reflected by the mirror. Even in the case of using such an illumination optical system, in the same way as the above-described embodiments, the use of a base frame that mount each of the optical parts of the illumination optical system makes it possible to easily align the optical parts of the illumination optical system.

In general, the base frame for the illumination optical system is integrally formed, and includes a plurality of mounting portions that define the locations of two or more of the plurality of optical parts disposed in the light path extending from the light source device to the superimposing optical system.

(3) Although in the above-described embodiments the optical parts are secured to the corresponding recesses and protrusions of the base frames 400, 500, and 500' with an adhesive, each of the optical parts may be secured with, for example, a clip. In general, the optical parts are secured to the recesses and protrusions, which are provided at the inner sides of the corresponding base frames.

(4) Although in the above-described embodiments the illumination optical system 100 includes the polarization generation optical system 160 in which the light-shielding plate 162, the polarization beam splitter array 164, and the $\lambda/2$ retardation films 166 are integrally formed, these optical parts may be separately provided. If the light-shielding plate 162 of the illumination optical system 100 is separately provided, a mounting portion that mounts the light-shielding plate 162 may be added to the base frames 400, 500, and 500'. Since the light-shielding plate 162 only selects and passes light incident upon the polarization beam splitter array 164, the precision of aligning is lower than those of the other optical parts. Therefore, when a metallic plate having an open portion is used as the light-shielding plate, the light-shielding plate may be press-fitted and secured to the mounting portion of the base frames. In the base frame 400 shown in FIG. 4, a mounting portion is also provided when the light-shielding plate is separately provided.

FIGS. 11(A) to 11(E) illustrate the base frame 400 (FIG. 4) in which the light-shielding plate is separately mounted, viewed from various directions. As shown in FIGS. 11(A) to 11(E), which are almost the same as FIGS. 6(A) to 6(E), a light-shielding plate 162' is separately mounted. This light-shielding plate 162' corresponds to a light-shielding surface that is further provided in the y direction of the light-shielding plate 162 shown in FIG. 2. The light-shielding plate 162' is positioned by second protrusions 450 and fourth protrusions 480 disposed between two protrusions 450, 460. More specifically, the light-shielding plate 162' is press-fitted and secured between an end surface of the second protrusion 450, which faces the fourth protrusion, and the surface of the fourth protrusion 480 opposed to the end surface of the second protrusion 450. When this is done, there are advantages that it is possible to omit the positional adjustment of the light-shielding plate 162' and to save the trouble of securing the light-shielding plate to the base frame 400 with an adhesive.

(5) Although the above embodiments are described using the case where the present invention is applied to a transmissive projector, the present invention may also be applied to a reflective projector.

Here, a "transmissive projector" refers to a type of projector in which electro-optical devices serving as light-modulating means transmit light like transmissive liquid crystal panels. A "reflective projector" refers to a type of projector in which electro-optical devices serving as light-modulating means reflect light like reflective liquid crystal panels. When the invention is applied to a reflective projector, advantages similar to those obtained when it is applied to a transmissive projector are provided.

(6) Although in the above-described embodiments the projector 1000 includes liquid crystal panels as electro-optical devices, it may include micromirror-type light-modulating devices instead of liquid crystal panels. As micromirror-type light-modulating devices, DMD (digital micromirror device) (a trademark of TI) may be used. As electro-optical devices, in general, any other devices that modulate incident light in accordance with image information may be used.

(7) Although the above-described embodiments are described using the projector 1000 that displays a color image as an example, the invention may similarly be applied to a projector that displays a monochrome image.

What is claimed is:

1. An optical unit, the optical unit comprising:
   an illumination optical system, the illumination optical system including a light source device, a lens array that divides light beams that exit from the light source device into a plurality of partial light beams, and a superimposing optical system that superimposes the plurality of partial light beams onto a predetermined illumination area;
   an electro-optical device that modulates light from the illumination optical system in accordance with image information;
   a projection optical system that projects the modulated light beam that is provided by the electro-optical device;
   a common base frame including a plurality of mounting portions that define locations of a plurality of optical parts disposed in a light path extending from the light source device to the electro-optical device; and
   a base frame fixedly mounted to a predetermined location of the common base frame, wherein
   the base frame is integrally molded, the base frame including a plurality of mounting portions that define locations of at least the lens array that divides light beams that exit from the light source device into a plurality of partial light beams and the superimposing optical system aligned in a light path extending from the light source device to the superimposing optical system.

2. The optical unit according to claim 1, the mounting portions being at least one of recesses and protrusions that are provided at an inner side of the base frame to secure at least the lens array and the superimposing optical system.

3. The optical unit according to claim 2, the base frame having a substantially rectangular parallelepiped external shape defining a pair of first to third side surfaces, an opening for light that passes through each of the optical parts being formed in the pair of first side surfaces, the at least one of the recesses and the protrusions being provided so as to form a pair at inner sides of the pair of second side surfaces in a direction perpendicular to the pair of third side surfaces, and at least one of the pair of third side surfaces opening to an exterior of the system.

4. The optical unit according to claim 2, the optical parts being mounted to corresponding mounting portions by being sandwiched between corresponding light-incident-surface-sides and light-exiting-surface sides thereof.

5. The optical unit according to claim 2, the optical parts being mounted to corresponding mounting portions so that the mounting portions are in contact with at least one of light-incident surfaces and light-exiting surfaces of the optical parts.

6. A projector, comprising the optical unit according to claim 1.

7. The projector according to claim 6, the mounting portions being at least one of recesses and protrusions that are provided at an inner side of the base frame, and each optical part being secured to the at least one of the recesses and the protrusions.

8. The projector according to claim 7, the base frame having a substantially rectangular parallelepiped external shape defining a pair of first to third side surfaces, an opening for light that passes through each of the optical parts being formed in the pair of first side surfaces, the at least one of the recesses and the protrusions being provided so as to form a pair at inner sides of the pair of second side surfaces in a direction perpendicular to the pair of third side surfaces, and at least one of the pair of third side surfaces opening to an exterior of the system.

9. The projector according to claim 7, the optical parts being mounted to corresponding mounting portions by being sandwiched between corresponding light-incident-surface sides and light-exiting-surface sides thereof.

10. The projector according to claim 7, the optical parts being mounted to corresponding mounting portions so that the mounting portions are in contact with at least one of light-incident surfaces and light-exiting surfaces of the optical parts.

* * * * *